United States Patent
Forrest

(10) Patent No.: US 7,302,583 B2
(45) Date of Patent: Nov. 27, 2007

(54) BIOMETRICS TEMPLATE

(75) Inventor: Simon J. Forrest, Dundee (GB)

(73) Assignee: NCR Corporation, Dayton, OH (US)

( * ) Notice: Subject to any disclaimer, the term of this patent is extended or adjusted under 35 U.S.C. 154(b) by 719 days.

(21) Appl. No.: 10/261,140

(22) Filed: Sep. 30, 2002

(65) Prior Publication Data

US 2003/0088782 A1    May 8, 2003

(30) Foreign Application Priority Data

Nov. 8, 2001   (GB) ................................ 0126819.2

(51) Int. Cl.
*H04L 9/00* (2006.01)
(52) U.S. Cl. ...................... 713/186; 713/168; 713/193; 380/44
(58) Field of Classification Search ...................... None
See application file for complete search history.

(56) References Cited

U.S. PATENT DOCUMENTS

| | | | |
|---|---|---|---|
| 6,118,874 A * | 9/2000 | Okamoto et al. ........... | 380/282 |
| 6,167,517 A * | 12/2000 | Gilchrist et al. ............ | 713/186 |
| 6,185,308 B1 * | 2/2001 | Ando et al. .................. | 380/286 |
| 6,310,966 B1 | 10/2001 | Dulude et al. | |
| 6,317,834 B1 * | 11/2001 | Gennaro et al. ............ | 713/186 |
| 6,490,680 B1 * | 12/2002 | Scheidt et al. .............. | 713/166 |
| 6,963,908 B1 * | 11/2005 | Lynch et al. ................ | 709/220 |
| 2001/0035814 A1 | 11/2001 | Udhida | |

FOREIGN PATENT DOCUMENTS

| EP | 1 079 565 A2 | 2/2001 |
|---|---|---|
| WO | WO 98/04996 A | 2/1998 |
| WO | WO 00/54455 A | 9/2000 |
| WO | WO 01/77788 A2 | 10/2001 |

OTHER PUBLICATIONS

Shamir A., "How to Share a Secret", Nov. 1979, ACM, Retrieved from the Internet on Dec. 6, 2004: <URL: http://delivery.acm.org/10.1145/360000/359176/p612-shamir.pdf?key1=359176&key2=6839709311&coll=ACM&dl=ACM&CFID=67620875&CFTOKEN=2383877>.*
Menezes et al., "Handbook of Applied Cryptography", 1997, CRC Press, 524-28.*

\* cited by examiner

*Primary Examiner*—Gilberto Barron
*Assistant Examiner*—Minh Dinh
(74) *Attorney, Agent, or Firm*—Gregory A. Welte

(57) ABSTRACT

Methods of storing and decrypting biometrics templates on a terminal network are described. A biometrics template 14 is encrypted 18 using a key 16, and the key 16 is then divided into a number of key shares 20. The encrypted template 18, a key share 20, and a user identifier 22 are then combined to give an identification string 24. A number of strings 24 are then stored on separate terminals 26 of a terminal network 28. To decrypt the template 14, a user offers their identifier 22 to a terminal 26. The required number of identification strings 24 having that identifier 22 are retrieved from their respective terminals 26 on the network 28, and the key shares 20 combined to generate a key 16 which is then used to decrypt the template 14. The decrypted template 14 may then be used to verify the identity of the user. Using the present method, neither the unencrypted template nor the complete decryption key are transferred across the network, so improving security.

19 Claims, 1 Drawing Sheet

BIOMETRICS TEMPLATE

BACKGROUND OF THE INVENTION

The present invention relates to a method of storing a biometrics template on a self-service terminal (SST) network, and to a method of verifying a claimed biometrics template. The invention further relates to a self-service terminal for use in such a network, and to a network itself. Certain aspects of the invention relate to methods of storing biometrics templates on other forms of network.

Self-service terminals (SSTs), such as automated teller machines (ATMs) are frequently used for high-value transactions, such as financial transactions. In order to reduce the risk of unauthorized third parties from fraudulently accessing a user's bank account or other financial property, a number of systems of user identification and verification are known. Potentially one of the most secure identification systems is the use of biometrics templates for identification. These rely on some inherent characteristic of the user being taken as the basis for identification; for example, a fingerprint, an iris or retina scan, a voiceprint, and the like.

Biometrics have the advantage that different individuals have different biometrics characteristics, and so only authorized users are able to present the correct characteristic to the SST for identification and access to the user's personal details, bank account, and the like. However, a potential difficulty of biometrics systems lies in the need to compare the user's current biometrics data with a previously-acquired record data for identification and verification. The current data may be compared with every record data stored to identify the user; however, this rapidly becomes computationally prohibitive as the number of users grows. Further, since record data will typically be stored on a central server, either the current data or the record data will have to be transferred between the SST in use and the central server for comparison, thereby providing an opportunity for unauthorized individuals to intercept the data transfer and duplicate the biometrics data. This client-server arrangement may also suffer from 'bottlenecks' in the event of heavy data traffic, as well as being liable to failure in the event of the server being offline for some reason. In addition, even if the relevant data is stored in encrypted form, the key to the encryption will also be stored in some location, such that interception of this key or access to the key store by unauthorized individuals may compromise the security of the network.

An alternative to this technique is for the user to carry a separate identification token carrying the record biometrics data for comparison. When the user presents the current data to the SST, the record data may be read from the token and compared. This avoids the need for biometrics data to be transferred over a network; however, storage of the complete biometrics data on a separate token raises security issues, should a third party obtain the token.

SUMMARY OF THE INVENTION

It is among the objects of embodiments of the present invention to obviate or alleviate these and other disadvantages of known biometrics identification methods. This is achieved, in part, in certain embodiments of the invention by the use of a so-called 'secret sharing algorithm'. Using such a sharing algorithm, data may be divided into a number of shares such that the complete data may be recreated using only a restricted subset of the shares. A number of sharing algorithms will be known to the skilled person, for example, Shamir's secret sharing scheme. The present invention is not however to be understood as being limited to any particular sharing algorithm.

According to a first aspect of the present invention, there is provided a method of storing a biometrics template on a terminal network, the method comprising the steps of: generating an encrypted biometrics template from a biometrics template using a cryptographic key; generating a plurality of shares of the key using a sharing algorithm; associating each respective key share with a copy of the encrypted template and an identification code for the template, to form an identification string; and storing each respective identification string on a respective terminal of a terminal network.

It will be understood that an 'identification string' as referred to herein does not refer to any particular specific form of data structure, but that any suitable data structure may be used to form the string.

The present invention thus allows an encrypted template to be stored together with a share of the relevant key on multiple terminals within a network. When decryption of the template is required, the required number of key shares to reconstruct the complete key are obtained from their storage locations, with the required template being identified by the identification code. Only encrypted templates are thus passed across the network, with the decryption key only being reassembled within the particular terminal which requires the key. Thus, there is a much reduced opportunity for third parties to intercept the biometrics template or the decryption key. Further, the use of an identification code to identify only the relevant key shares means that the biometrics of a user does not require to be compared with every biometrics record on the network, hence saving processing time, yet interception of the identification code by a third party does not permit the third party to duplicate the biometrics data of the authorized user. The present invention is thus more secure than known biometrics systems.

The number of shares generated and the number of shares required to reconstruct the key may be chosen depending on the needs of the network operator: factors such as the size of the network, the number of users of the network, the desired response times for the network, and the desired degree of redundancy in the storage of the template will all affect the desired number of shares. In addition, the size of the key itself and the sharing algorithm used may also affect the number of shares which may be created.

The method preferably further comprises the steps of generating a list of the locations of each respective identification string, and storing a copy of the list on each respective terminal. The list may contain details only of the location of each identification string having a particular identification code. This allows a terminal to request an identification string for a particular identification code from only those terminals on which the identification string is stored, so further decreasing the time required to reassemble a particular key. In certain embodiments of the invention, the list may be constructed from a cryptographic hash of the key share, the encrypted template, and an identification code of the terminal.

The method may further comprise the step of generating the cryptographic key prior to encrypting the biometrics template. A cryptographic hash function or the like may be used for generation of the cryptographic key, of the identification string, and the like. For example, hash functions such as MD5 or SHA-1 may be used. As an alternative to generating the cryptographic key, the key may be taken from a pre-prepared choice of keys.

The method may further comprise the step of acquiring a biometrics template from a user prior to generating the encrypted template. Acquisition is preferably conducted in a secure location, with encryption occurring as soon as practicable afterward, to reduce the risks of the template becoming compromised. In selected embodiments of the invention, the acquisition and/or encryption steps may be shown to the user, thereby allowing the user to be reassured of the security of the system.

The terminals on which the identification strings are stored may be selected according to some characteristic of the user. For example, the identification strings may be initially stored in those terminals close (in network terms) to the location from which the user of the network will be expected to access the network. This may be selected in geographic terms, such as postcode of the user, or the user's bank sort code or the like. This 'local' storage will be expected to lessen the time required to retrieve and reassemble the key for the user's biometrics template in the majority of situations.

The method may further comprise the step of moving an identification string to an alternative terminal for storage. This may be performed in response to a change in the usual network access location of the user; for example, should the user travel to a different city on a banking network, their network access location will be this new city, rather than the original location. In response to this move, their identification strings may move as well, so reducing the time required to reassemble their key. The move in storage may be permanent or temporary—for example, the identification string may be accompanied with a time stamp, whereby if no requests for the identification string are made from that location within a certain time limit, the storage will revert to the original location. Movement of the identification string may involve the step of deleting the string from the original location; alternatively the string may simply be copied, to form a local cache. The original string again may be time stamped, to delete if the user's move should prove to be long-term.

Preferably the network is a network of self-service terminals (SSTs).

According to a further aspect of the present invention, there is provided a method of verifying a claimed biometrics identity of a user on a terminal network, the method comprising the steps of: obtaining a biometrics identity and an identification code from a user at a terminal of a terminal network; obtaining a plurality of identification strings associated with the identification code from terminals of a terminal network, each identification string comprising an encrypted biometrics template, a key share, and an identification code; combining a plurality of key shares to generate a key; decrypting at least one of the encrypted biometrics templates by means of the generated key to generate a decrypted biometrics template; and verifying the biometrics identity of the user against the decrypted biometrics template.

The method may further comprise the steps of identifying the locations on the network of the identification strings corresponding to the identification code; and requesting the appropriate terminals for the identification strings. The string locations may be identified from, for example, a look-up table, list, or the like, containing details of the locations of each identification string and its associated identification code. Alternatively, the method may comprise the step of broadcasting a request for the identification strings to the network without first identifying the location of the relevant identification strings. This method removes the need for any terminal on the network to maintain a list of the locations of each of the identification strings. Where a request is broadcast, the method may comprise the steps of broadcasting the request firstly to a subset of the network, and if no response is received broadcasting the request to a larger subset or the whole of the network. For example, the request may first of all be broadcast to only those terminals within a certain distance of the requesting terminal, on the assumption that the user's details are likely to be stored in that region of the network; if no response is received, the request may then be sent to the whole of the network.

The identification code may be for example stored on a smart card or the like presented by the user to the terminal, or may take the form of a numeric or other code entered by the user.

The identification code may be specific to that user, or may be shared amongst a group of users. For example, all users within a defined geographic area may share an identification code. The terminal will then retrieve a group of identification strings with associated biometrics templates; the group of templates may then be compared with the user's presented biometrics identification to verify the user's identity within that group. This has the advantage of improved security, since the user is never specifically identified across the network, but this is associated with an increased computation cost, as more templates must be compared to verify the user's identity.

The method may further comprise the step of conducting a tamper-check on the biometrics template before verifying the biometrics identity. For example, a plurality of encrypted templates for the same user may be decrypted and compared; any discrepancies will suggest there has been some interference with the templates. Alternative tamper checking methods may of course be used.

The method may further comprise the step of caching one or more of the obtained identification strings on the terminal. The cache may be temporary or permanent. This allows the terminal to respond more quickly to subsequent verification requests, and allows the user's identification strings to migrate around the network as the user's access point moves around the network. Where the cache is temporary, the cache may be emptied after a predetermined time period, or if the cached string is not used for a certain period of time.

Preferably the terminals are self service terminals (SSTs).

The above-described aspects of the invention involve the storage of the identification strings on terminals of the network. There may, however, be instances where it is desirable to store the identification strings on a central server. While this does retain all the strings in one location, and so reduces security slightly, there is still no movement at any point of the whole of the key or template across the network, and security is thus still present.

According to a third aspect of the present invention, there is provided a method of storing a biometrics template within a terminal network having a server and terminals, the method comprising the steps of: generating an encrypted biometrics template from a biometrics template using a cryptographic key; generating a plurality of shares of the key using a sharing algorithm; associating each respective key share with a copy of the encrypted template and an identification code for the template, to form an identification string; and storing each respective identification string on a server of a terminal network.

According to a further aspect of the present invention, there is provided a method of verifying a claimed biometrics identity of a user on a terminal network having a server and terminals, the method comprising the steps of: obtaining a biometrics identity and an identification code from a user at a terminal of a terminal network; obtaining a plurality of identification strings corresponding to the identification code from a server of a terminal network, each identification string comprising an encrypted biometrics template, a key share, and an identification code; combining a plurality of key shares to generate a key; decrypting at least one of the encrypted biometrics templates using said generated key to generate a decrypted biometrics template; and verifying the biometrics identity of the user against the decrypted biometrics template.

The methods so far described rely on the provision of an identification code to identify the relevant biometrics template or user for verification. However, with networks of a sufficiently small size, comparison of all templates against the user's biometrics identity will be possible without being computationally prohibitive. 'Sufficiently small' is of course a relative term, and will depend partly on the computing power within the network, and partly on the perceived acceptable time to verify a user. Such aspects of the invention may be of particular application in building security systems and the like, where a restricted number of users must be verified and where the use of separate identification codes may not be desirable.

According to a fifth aspect of the present invention, there is provided a method of storing a biometrics template on a terminal network, the method comprising the steps of: generating an encrypted biometrics template from a biometrics template using a cryptographic key; generating a plurality of shares of the key using a sharing algorithm; associating each respective key share with a copy of the encrypted template to form an identification string; and storing each respective identification string on a respective terminal of a terminal network.

According to a further aspect of the present invention, there is provided a method of verifying a claimed biometrics identity of a user on a terminal network, the method comprising the steps of: obtaining a biometrics identity from a user at a terminal of a terminal network; obtaining a plurality of identification strings from terminals of a terminal network, each identification string comprising an encrypted biometrics template and a key share; combining a plurality of key shares to generate a key; decrypting at least one of the encrypted biometrics templates using the generated key to generate a decrypted biometrics template; and verifying the biometrics identity of the user against the decrypted biometrics template.

These aspects of the invention may of course also be applied to a central server network model as well as a terminal network model.

According to a still further aspect of the present invention, there is provided a terminal for use in a terminal network, the terminal comprising: means for obtaining a biometrics identity from a user; means for obtaining an identification code from a user; means for requesting identification strings from a remote location on a network; means for combining key shares from identification strings to generate a decryption key; means for decrypting an encrypted biometrics template contained within an identification string using a generated key; and means for verifying a decrypted biometrics template against the user's biometrics identity.

The terminal may further comprise means for storing identification strings, and means for responding to requests for an identification string from remote network terminals.

Preferably the terminal is a self service terminal (SST).

According to a still further aspect of the present invention, there is provided a terminal network comprising a plurality of terminals, each terminal comprising: means for obtaining a biometrics identity from a user; means for obtaining an identification code from a user; means for requesting identification strings from a remote location on a network; means for combining key shares from identification strings to generate a decryption key; means for decrypting an encrypted biometrics template contained within an identification string using a generated key; and means for verifying a decrypted biometrics template against the user's biometrics identity.

The network may further comprise a server, the server comprising means for storing a plurality of identification strings, and means for responding to requests for an identification string from a terminal. Alternatively, each terminal may further comprise means for storing identification strings, and means for responding to requests for an identification string from a terminal.

BRIEF DESCRIPTION OF THE DRAWINGS

These and other aspects of the present invention will now be described by way of example only and with reference to the accompanying drawings, in which.

DETAILED DESCRIPTION

Figure 1:
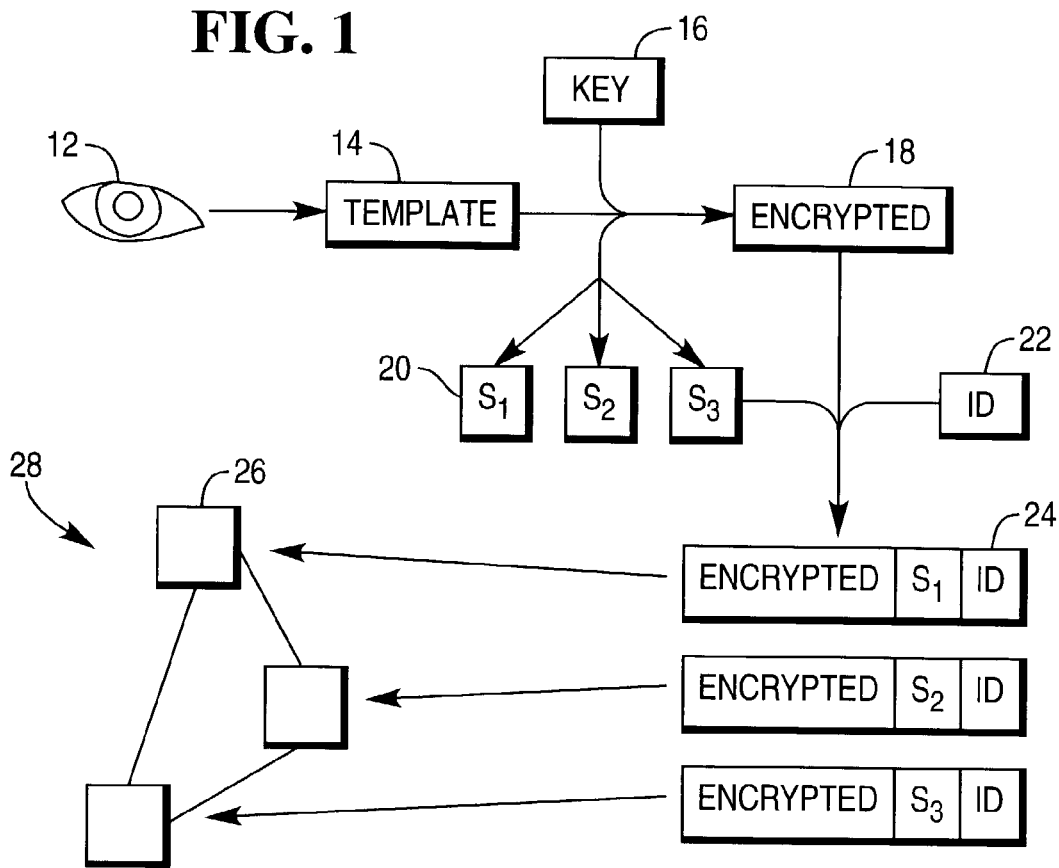
FIG. 1 shows a schematic representation of the method of storing a biometrics template on a network in accordance with one embodiment of the present invention.

Referring first of all to FIG. 1, this illustrates schematically a method of storing a biometrics template on a network in accordance with one embodiment of the present invention.

A user wishing to be registered on the network first of all presents their eye 12 to a biometrics scanning station, where the eye 12 is scanned, and a digitized image converted into a biometrics template 14. The generation of a biometrics template from the eye is wellknown, and need not be described further here. It will be appreciated that the biometrics template need not be derived from the eye, but may come from any other suitable part of the body.

The template 14 is then combined with a cryptographic key 16, by means of any suitable encryption algorithm, to generate an encrypted template 18. Meanwhile, the key 16 is divided into a number of key shares 20, the precise number of shares and algorithm used depending on the needs of the network operator. A unique identification code 22 is also generated, and assigned to the user.

Each key share 20 is then combined with a copy of the encrypted template 18 and the identification code 22, to generate an identification string 24. Each string 24 is then passed to a terminal 26 of a terminal network 28, where the string 24 will be stored. At the same time, if desired, a look-up table may be generated from the identification code 22 and the location of each terminal 26 which received an identification string 24 having that identification code 22, and a copy of the look-up table stored on each terminal 26.

Figure 2:
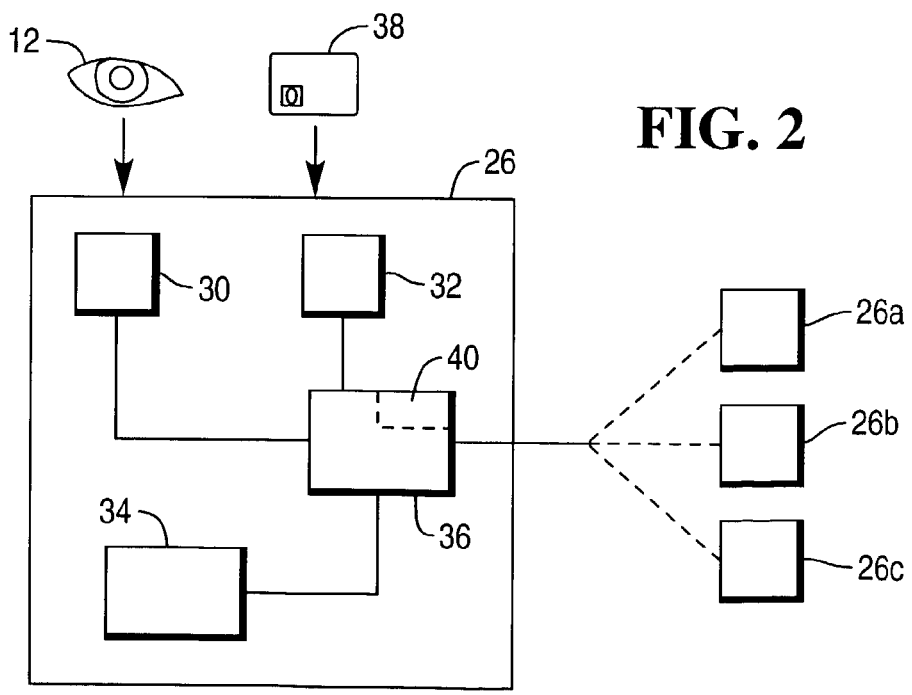
FIG. 2 shows a schematic representation of a terminal of a network in accordance with a further embodiment of the present invention.

Turning now to FIG. 2, this shows a terminal 26 in more detail. The terminal 26 comprises a biometrics scanning station 30, a smart card reader 32, and a display screen 34, all of which are connected to and controlled by a processor 36. The processor 36 also communicates via a network with other terminals 26a, 26b, 26c.

When a user wishes to access the network, they present their eye 12 to the biometrics scanning station 30, while also presenting a smart card 38 having that user's identification code 22 stored thereon to the smart card reader 32. The scanning station 30 converts features of the user's eye 12 to a biometrics identifier, which is passed to the processor 36 together with the identification code 22. The processor then determines from the look-up table the location on the network of a suitable number of identification strings 24 having that identification code 22, sufficient to reconstruct the key 16. A request is sent to the appropriate terminals 26a, 26b, 26c for the relevant identification string 24, which strings 24 are then returned to the processor 36.

The identification code of the strings 24 is first of all verified to ensure that the correct strings have been returned, and the key shares 20 are then stripped from the identification strings 24 and the encryption key 16 reconstructed. One of the encrypted templates 18 is selected and decrypted with the key 16, to generate a decrypted template. This is then compared against the user's scanned biometrics identifier, and if verification is successful, an appropriate message is displayed on the display screen 34, and the user is granted access to the network.

For added security, a number of encrypted templates may be decrypted, and compared, with any discrepancies suggesting that some tampering has occurred with the stored templates.

As an alternative to the use of a look-up table, the processor 36 may simply broadcast a request to the network for any identification strings 24 having the correct identification code, with the relevant terminals 26a, 26b, 26c responding to the request.

The terminal 26 may also be provided with a cache storage 40, in which any requested identification strings may be stored temporarily, to allow more rapid access to previously-used strings. Where a look-up table is used, the processor 36 may broadcast an update of the table to indicate the new location of the string at times of low network activity. Little-used strings may also be deleted from storage (whether in the cache 40 or otherwise) on a terminal 26 after a certain time, to avoid unnecessary storage. In this way, strings will gradually 'migrate' over the network to those locations where they are most used, so improving the efficiency of network access.

What is claimed is:

1. A method of storing a biometrics template on a terminal network, the method comprising the steps of:
   generating an encrypted biometrics template from a biometrics template using a cryptographic key;
   generating a plurality of shares of the key using a sharing algorithm;
   associating each respective key share with a copy of the encrypted template and an identification code for the template, to form an identification string; and
   storing each respective identification string on a respective terminal of a terminal network.

2. A method according to claim 1, further comprising the steps of:
   generating a list of the locations of each respective identification string, and
   storing a copy of the list on each respective terminal.

3. A method according to claim 1, further comprising the step of:
   moving an identification string to an alternative terminal for storage.

4. A method according to claim 2, further comprising the step of:
   moving an identification string to an alternative terminal for storage.

5. A method of verifying a claimed biometrics identity of a user on a terminal network, the method comprising the steps of:
   obtaining a biometrics identity and an identification code from a user at a terminal of a terminal network;
   requesting and obtaining a plurality of identification strings associated with the identification code from terminals of a terminal network, each identification string comprising an encrypted biometrics template, a key share, and an identification code;
   combining a plurality of key shares to generate a key;
   decrypting at least one of the encrypted biometrics templates by means of the generated key to generate a decrypted biometrics template and
   verifying the biometrics identity of the user against the decrypted biometrics template.

6. A method of storing a biometrics template within a terminal network having a server and terminals, the method comprising the steps of:
   generating an encrypted biometrics template from a biometrics template using a cryptographic key;
   generating a plurality of shares of the key using a sharing algorithm;
   associating each respective key share with a copy of the encrypted template and an identification code for the template, to form an identification string and
   storing each respective identification string on a server of a terminal network.

7. A method of verifying a claimed biometrics identity of a user on a terminal network having a server and terminals, the method comprising the steps of:
   obtaining a biometrics identity and an identification code from a user at a terminal of a terminal network;
   obtaining a plurality of identification strings corresponding to the identification code from a server of a terminal network, each identification string comprising an encrypted biometrics template, a key share, and an identification code;
   combining a plurality of key shares to generate a key;
   decrypting at least one of the encrypted biometrics templates using said generated key to generate a decrypted biometrics template; and
   verifying the biometrics identity of the user against the decrypted biometrics template.

8. A method of storing a biometrics template on a terminal network, the method comprising the steps of:
   generating an encrypted biometrics template from a biometrics template using a cryptographic key;
   generating a plurality of shares of the key using a sharing algorithm;
   associating each respective key share with a copy of the encrypted template and with an identification code to form an identification string; and
   storing each respective identification string on a respective terminal of a terminal network.

9. A method of verifying a claimed biometrics identity of a user on a terminal network, the method comprising the steps of:
   obtaining a biometrics identity from a user at a terminal of a terminal network;
   requesting and obtaining a plurality of identification strings from terminals of a terminal network, each identification string comprising an encrypted biometrics template, an identification code, and a key share;
   combining a plurality of key shares to generate a key;

decrypting at least one of the encrypted biometrics templates using the generated key to generate a decrypted biometrics template and verifying the biometrics identity of the user against the decrypted biometrics template.

10. A terminal for use in a terminal network, the terminal comprising:

means for obtaining a biometrics identity from a user;

means for obtaining an identification code from a user;

means for using the identification code to request one or more identification strings from a remote location on a network;

means for combining key shares from identification strings to generate a decryption key;

means for decrypting an encrypted biometrics template contained within an identification string using a generated key; and means for verifying a decrypted biometrics template against the user's biometrics identity.

11. Method according to claim 5, wherein the terminal which obtains the biometrics identity and identification codes from the user comprises an Automated Teller Machine, ATM.

12. Method according to claim 7, wherein the terminal which obtains the biometrics identity and identification codes from the user comprises an Automated Teller Machine, ATM.

13. Method according to claim 9, wherein the terminal which obtains the biometrics identity and identification codes from the user comprises an Automated Teller Machine, ATM.

14. Apparatus according to claim 10, wherein the terminal comprises an Automated Teller Machine, ATM.

15. Method according to claim 1, and further comprising:

delivering several of said identification strings to a single terminal, in response to multiple requests issued by that single terminal.

16. Method according to claim 5, wherein a single terminal obtains said plurality of identification strings, by issuing requests to the terminals storing said strings.

17. Method according to claim 6, and further comprising:

delivering several of said identification strings to a single terminal, in response to multiple requests issued by that single terminal.

18. Method according to claim 7, wherein a single terminal obtains said plurality of identification strings, by issuing requests to the terminals storing said strings.

19. Method according to claim 8, and further comprising:

delivering several of said identification strings to a single terminal, in response to multiple requests issued by that single terminal.

* * * * *